United States Patent [19]

Beese et al.

[11] 4,247,325

[45] Jan. 27, 1981

[54] PH CONTROL DURING LEACHING OF ALUMINUM SLAGS

[75] Inventors: Ronald E. Beese, Barrington, Ill.; Niranjan M. Parikh, Winnetka; Carl F. Bauer, Chicago, all of Ill.

[73] Assignee: American Can Company, Greenwich, Conn.

[21] Appl. No.: 61,606

[22] Filed: Jul. 30, 1979

[51] Int. Cl.³ .............................................. C22B 21/00
[52] U.S. Cl. ................................. 75/97 A; 75/68 R; 423/132
[58] Field of Search ....................... 75/24, 68 R, 97 A; 423/132

[56] References Cited

U.S. PATENT DOCUMENTS

| 1,262,063 | 4/1918 | Lawrie | 423/132 |
| 1,517,689 | 12/1924 | Welch | 75/24 |
| 3,660,076 | 5/1972 | Williams | 75/68 R |
| 3,955,969 | 5/1976 | Johnson | 75/68 R |
| 4,073,644 | 2/1978 | Papafingos | 75/68 R |

OTHER PUBLICATIONS

Garst et al., "The Recovery of Metal and Other Valuable Products from Aluminum Dross", U.S. Bureau of Mines, R.I. 3874 (5/1946), pp. 2, 8–12.

Primary Examiner—Brian E. Hearn
Attorney, Agent, or Firm—Robert P. Auber; Stuart S. Bowie; Aaron Passman

[57] ABSTRACT

A technique for controlling severe chemical reactions which occur when salt containing furnace slags from secondary aluminum melting operations are brought in contact with water is provided. The technique which retards the formation and evolution of hydrogen gas resulting from the reaction of aluminum metal fines with water in the presence of chloride and the formation and evolution of ammonia gas from the reaction of aluminum nitride with water is accomplished by controlling the pH of the water-solid slurry to be around 8. Consequently, the formation and gaseous evolution of hydrogen is controlled and the evolution of ammonia is eliminated with a concomitant elimination of explosion and fire hazards associated with the uncontrolled chemical reactions.

3 Claims, 1 Drawing Figure

PH CONTROL DURING LEACHING OF ALUMINUM SLAGS

BACKGROUND OF THE INVENTION

In the refining of slags for the purposes of recovering valuable metal the process involves handling much of the slag which is worthless. However, a discrete portion consists of a mixture of free metal and non-metallic substance in percentages that could make it attractive to separate the metal from the slag with a proper process. One technique includes a rotating furnace mounted on a horizontal axis for heating the slag either internally or externally to treat either wet or dry slag, in an effort to separate the metal component. More particularly, the entrained metal and metal oxides differ in their density so that they separate when they are brought to a liquid state and agitated in the hot furnace. Thus separated, the unwanted slag portion can be decanted leaving the metal sought to be recovered or the metal can be poured off leaving the slag.

The foregoing relates to furnace processes which are popular. Those processes are unsatisfactory in that at least 5% of the metal remains trapped in the slag, and/or the heat required for the process is energy intensive thus being costly. In addition, in those processes which utilize the thermal energy associated with the exothermic oxidation of the metallic species such exothermic reactions destroy a significant proportion of the free aluminum metal when generating heat. Moreover, the operation of the furnace is expensive in terms of maintenance and power consumption.

Furthermore, the salts remain trapped in the slag, and these salts are necessary in the furnace refining process to act as a flux in protecting the metal from oxidation. It is, therefore, expensive to use the rotating furnace process in that 5% of the metal is not recoverable or recyclable, and disposal of the remaining slag containing salt presents problems. Furthermore, the use of such slags in land fill, in the manufacturing of pavement and concrete, and for fill in refractory or other similar cements is prevented.

Other techniques for the processing of salt containing furnace slags have been shown to exist and are related to leaching and washing processes that use water to extract soluble salts from the insoluble metals and their oxides. Such processes are known in connection with the treatment of slag. More particularly, the Papafingos et al U.S. Pat. No. 4,073,644 describes a method of processing aluminum slag by leaching wherein the slag is put in a rotating drum set about an axis which is elevated slightly from horizontal such that solubles go into a solution with water and the insolubles either remain suspended or sink, depending upon their particle size. The suspended insolubles in the slurry can thereby be removed from the low end of the rotating drum. Any remaining materials in the slurry can then be separated by a trap and filters. The remaining solution is distilled to remove the salt.

The problem with such a leaching process is that the water solvent has been found to react with the free metal and/or other trace impurities such as aluminum carbide and aluminum nitride in the slag, generating heat and resulting in the evolution of dangerous gases. Furthermore, these reactions are uncontrolled and powerful. More particularly, as much as 50,000 gallons of slag and solvent can be raised nearly 150° F. in less than one hour causing the evolution of methane, hydrogen and ammonia and/or hydrogen sulfide. Such an uncontrolled reaction is unsafe in that fires will ensure which could destroy the leaching equipment and consume the recoverable metal. Moreover, the air quality around the process is totally unacceptable. The improvement of the present invention relates to a means by which the reaction in the leaching drum can be minimized and the severe chemical processes creating hazardous gases and resulting in increases in temperature can be controlled.

OBJECTS OF THE INVENTION

An object of the present invention is to provide a process which is efficient in that heat is not required and metal is not destroyed in separating metal from slag.

Another object of the invention is to have a process wherein substantially all of the metal is removed from the slag.

Still another object of the invention is to have a process wherein the salts used as flux during refining are recaptured and removed from the slag.

A further object of the invention is to provide a process wherein the slag is leached in controlled pH solvent so as to prevent dangerous fires and control the evolution of hazardous gases. From the Summary of the Invention which follows the specific process will be appreciated to a greater extent.

SUMMARY OF THE INVENTION

The process includes a system for monitoring the pH in the slurry solution, that is removed from the low end of the leaching drum, by means of a thermally compensated pH electrode which measures the hydrogen ion potential in the float solution. Should the pH increase above a cutoff point of 8, the pH monitoring system emits a control signal to an apparatus which will dispense a quantity of acid into the leaching drum in order to maintain the pH at 8 but above 5. It has been found that hydrochloric acid works well in that it does not add additional interfering ions to the slurry in the leaching process.

Notwithstanding the fact that a monitor is measuring the pH of the slurry solution of the float aft of the leaching drum, the effect of acid addition into the front of the leaching process is observed almost immediately even though it would normally be expected that the 50,000 gallons of slurry being processed should act as a buffer requiring long times for changes in the solution to be observed. The system has proven itself effective in eliminating the rapid increase in slurry temperature and the consequent evolution of dangerous and explosive gas mixtures. The processing effectively short circuits the reaction of aluminum metal fines and aluminum nitride with water to form hydrogen and ammonia and thereby controls the reaction of aluminum with the high chloride brine which would increase the evolution of hydrogen resulting in an additional explosive gas mixture.

DETAILED DESCRIPTION OF THE INVENTION

Figure 1:
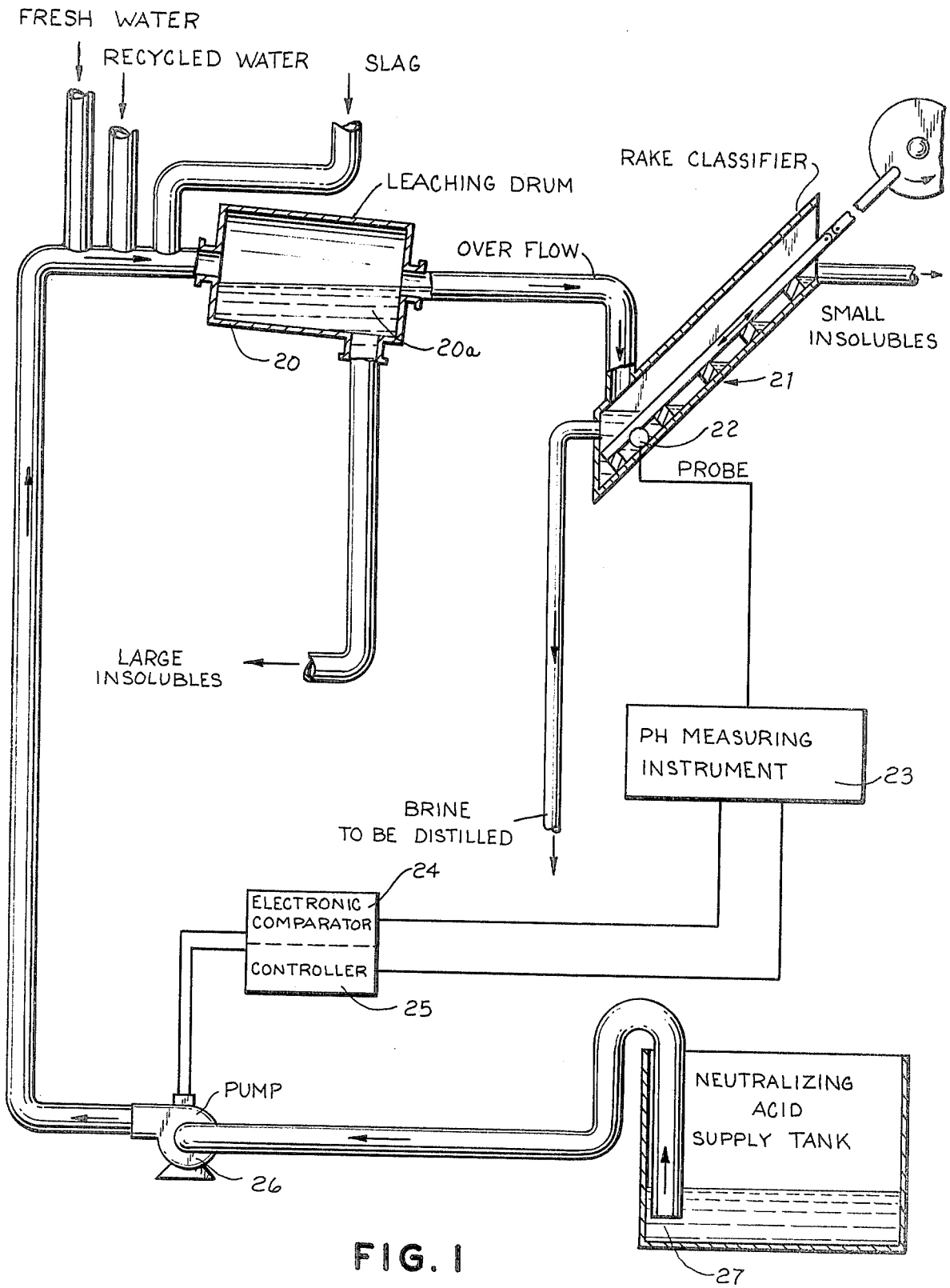
FIG. 1 is a schematic flow diagram in block form of the operation of the present invention.

The block diagram of FIG. 1 shows schematically the various equipment used in the process of leaching salt containing slag, separating entrained aluminum in the slag and controlling the process. The operation begins with the input to the leaching drum 20. More particularly, the leaching drum 20 is a large metallic container which is designed to rotate about an axis which slops slightly from the horizontal such that the material contained therein is able to be floated off the top part 20a of the low end of the drum. The drum 20 is sufficient in volume to contain 50,000 gallons of recycled wash water and slag. The slag material is produced in normal secondary aluminum smelting operations and normally contains approximately 45% salts as sodium chloride, potassium chloride or a mixture thereof, 15% metallic aluminum and the balance oxides of several metals such as aluminum, magnesium and iron. The fresh water is taken directly from the tap and the recycled water is basically filtered low concentration brine from the end of the salt recovery operation. The drum is custom made for this particular operation and has the approximate dimensions of 12 ft. in diameter by 20 ft. in length. It is constructed of mild steel and is substantially water tight except at the top part 20a of the low end of the drum, where there is an opening provided to permit the lighter materials in the slurry to flow out of the drum, i.e. the liquified effluent from the leaching process. The liquid effluent consists of suspended particulate and dissolved salts in water. In order to remove the particulates, the liquid effluent is fed into a rake classifier 21 wherein the heavier particulates are dropped to the bottom of the rake classifier 21 and are mechanically separated by means of a drag bar which carries the particulate matter up along an inclined plane and out of the rake classifier.

The remaining liquid is primarily water and dissolved salts and some remaining insoluble materials which are pumped off and filtered to remove the remainder of the insoluble materials. The clarified liquid brine is then sent to a distilling operation where the water is separated from the salts. The salts can then be reused as a flux in an aluminum smelting operation and the water can be recycled into the leaching drum 20. In the bottom of the rake classifier 21 there is a pH probe 22 capable of measuring the alkalinity of the liquid effluent solution. The pH probe 22 is in the nature of a thermally compensated electrode which checks the hydrogen ion potential of the solution. The method of pH measurement preferred is a model 30 AC pH/temp. unit 23 manufactured by Analytical Measurements Incorporated and thermally compensated over the range 0°-212° F. Many other instruments of this type are available and could also be suited to this application. The above unit provides a 0.1 ma per pH unit control signal that is proportional to the relative pH of the liquid effluent. The control signal is directed to an electronic circuit 24 in the nature of a comparator which is designed to emit a signal in accordance with the relative alkalinity of the liquid effluent. That is to say, that the greater the alkalinity the greater the signal emitted by the electronic circuit. By which means the circuit 24 functions to compare the signal from the pH electrode 22 with a desired datum and to emit a control signal in accordance with the difference therebetween.

The control signal is used to activate a pump controller 25 which is in the nature of a relay that operates a pump 26. The preferred pump 26 is Model M5425 manufactured by Madden, Inc. and is designed to pump a maximum of 60 gallons per minute at 80 psi of hydrochloric acid solution at 18 to 20 Baume. The hydrochloric acid is pumped from a supply tank 27 into the leaching drum 20; the pump 26 has been specifically selected because it is able to handle hydrochloric acid without corroding or leaking. The object of the acid addition to the leaching drum 20 is to maintain the pH about 8, for which purpose the aforesaid electronic circuit pump controller 25 and pump 26 have been found to be adequate to maintain the pH at the desired level. Previous to the addition of hydrochloric acid to the leaching process and before the control of the leaching slurry pH to about 8 but above 5, uncontrolled chemical reactions in the process mixture containine chloride salts, aluminum nitride, metallic aluminum, hydrated aluminum oxide and other trace materials such as aluminum carbide, magnesium and iron oxide resulted in severe and hazardous conditions in the process. Specifically, and, in particular, the following principle chemical reactions contributed to the above conditions:

$$Al_2N_2 + 6H_2O \rightarrow 2Al(OH)_3 + 2NH_3 \qquad \text{Equation 1:}$$

$$NH_3 + H_2O \rightarrow NH_4^+ + OH^- \qquad \text{Equation 2:}$$

These reactions drive the solution chemistry to provide increased hydroxide ion concentrations i.e., a solution with a pH higher than 8 and result in further complex hazardous reactions with the free aluminum in the mixture so that:

$$2Al + 2H_2O + 4OH^- \rightarrow 2Al(OH)_3 + H_2 + \Delta H \qquad \text{Equation 3:}$$

produce a large volume of excess hydrogen gas which escapes into the head space of the leaching drum and at the same time significant amounts of heat ($\Delta H$) which act to heat the liquid volume further enhancing the reactions occurring in the process.

It has been found that by neutralizing the reaction, represented by Equation 2 with the hydrochloric acid, the hazardous reaction does not take place and the chemical formulation for the leaching operation is modified as represented in Equation 4.

$$NH_4OH + HCL \rightarrow NH_4CL + H_2O \qquad \text{Equation 4:}$$

It is noted from the above that the hydroxide ion concentration ($OH^-$) is complexed by the acid addition, is reduced by the acid addition and is neutralized as simple water. This reduction leads to lower pH (control about pH8) and removes the driving force for the exothermic reactions of metallic aluminum creating hazardous hydrogen gas and increased heat as shown in Equation 3.

From the foregoing, it can be seen that the evolution of hazardous gases and generation of unnecessary and dangerous high temperatures has been effectively prevented and the leaching operation is permitted to take place without the destructive and dangerous byproducts of the reaction of the water and metallic aluminum fines and aluminum nitride. While a particular system has been disclosed using preferred equipment in combination with pH monitoring equipment and circuitry, the invention in its broader aspects is believed to include any technique whereby the alkalinity level of the material in the leaching drum is maintained low enough so that harmful byproducts of the reaction are not generated and the exothermic nature of the reaction is controlled, and yet high enough (pH5) so that the direct reaction of aluminum with excess acid does not occur. It is, therefore, desired that the claims which follow will cover any process by which the foregoing is achieved, including those which use different equipment and neutralizing chemicals.

What is claimed is:

1. A method of controlling the chemical reaction in the leaching drum during the processing of secondary metallic aluminum slags, to reduce exothermic reactions and gaseous byproducts including the following steps:
   (a) treating secondary aluminum slags with water in order to dissolve entrained salts and separate same from metallic particulates;
   (b) measuring the pH of the dissolved salts slurry in order to establish the condition of the process;
   (c) comparing the measuring pH with a preferred datum and emitting a control signal in accordance with the difference therebetween for actuating the pumping of a neutralizing acid into the leaching operation to maintain a pH of about 8, and
   (d) adding a neutralizing acid to the mixture of water and aluminum slag in order to maintain said pH.

2. The method of claim 1 wherein the neutralizing acid is hydrochloric acid having Baume of 18 to 20.

3. The method of claim 1 wherein the preferred datum represents a pH of about 8 but above 5 in the leaching drum.

* * * * *